United States Patent
Ohyama et al.

(10) Patent No.: US 12,474,830 B2
(45) Date of Patent: Nov. 18, 2025

(54) DISPLAY DEVICE, IMAGE DISPLAY METHOD, AND STORAGE MEDIUM STORING IMAGE DISPLAY PROGRAM

(71) Applicant: DENSO CORPORATION, Kariya (JP)

(72) Inventors: Kohji Ohyama, Kariya (JP); Yuji Kawahara, Kariya (JP); Shingo Yamashita, Kariya (JP); Mingxiao Zhang, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/625,819

(22) Filed: Apr. 3, 2024

(65) Prior Publication Data
US 2024/0281133 A1 Aug. 22, 2024

Related U.S. Application Data

(63) Continuation of application No. PCT/JP2022/035200, filed on Sep. 21, 2022.

(30) Foreign Application Priority Data

Oct. 5, 2021 (JP) .................................. 2021-164345

(51) Int. Cl.
G06F 3/0488 (2022.01)
G06F 3/01 (2006.01)
G06F 3/04845 (2022.01)

(52) U.S. Cl.
CPC ............ *G06F 3/0488* (2013.01); *G06F 3/016* (2013.01); *G06F 3/04845* (2013.01); *G06F 2203/04803* (2013.01)

(58) Field of Classification Search
CPC .... G06F 3/0488; G06F 3/016; G06F 3/04845; G06F 2203/04803; G06F 3/01; G06F 3/0481
See application file for complete search history.

(56) References Cited

U.S. PATENT DOCUMENTS

2008/0303782 A1* 12/2008 Grant ...................... G06F 3/016
345/173
2010/0182265 A1 7/2010 Kim et al.
2011/0126141 A1* 5/2011 King ................... H04M 1/0247
715/847
(Continued)

FOREIGN PATENT DOCUMENTS

CN 111078091 A 4/2020
JP 2013020529 A 1/2013
(Continued)

*Primary Examiner* — Abhishek Sarma
(74) *Attorney, Agent, or Firm* — Harness, Dickey & Pierce, P.L.C.

(57) ABSTRACT

A display device includes: a display including a display portion which is a region where an image is to be displayed and an operation portion which is a region disposed to be inclined with respect to a virtual plane formed by the display portion and capable of allowing image display and a touch operation to be performed thereon; and a control unit that controls image display on the display. The control unit executes display control which is at least one of: first display control of causing the operation portion to display the notification; or second display control of causing the display portion to display an image corresponding to the touch operation.

8 Claims, 13 Drawing Sheets

(56) References Cited

U.S. PATENT DOCUMENTS

| | | |
|---|---|---|
| 2013/0318437 A1 | 11/2013 | Jung et al. |
| 2016/0187976 A1 | 6/2016 | Levesque et al. |
| 2022/0066724 A1* | 3/2022 | Moon .................. G06F 1/1681 |
| 2022/0300154 A1 | 9/2022 | Li |

FOREIGN PATENT DOCUMENTS

| | | |
|---|---|---|
| JP | 2015527626 A | 9/2015 |
| JP | 2016126773 A | 7/2016 |

* cited by examiner

DISPLAY DEVICE, IMAGE DISPLAY METHOD, AND STORAGE MEDIUM STORING IMAGE DISPLAY PROGRAM

CROSS REFERENCE TO RELATED APPLICATION

The present application is a continuation application of International Patent Application No. PCT/JP2022/035200 filed on Sep. 21, 2022 which designated the U.S. and claims the benefit of priority from Japanese Patent Application No. 2021-164345 filed on Oct. 5, 2021. The entire disclosures of all of the above applications are incorporated herein by reference.

TECHNICAL FIELD

The present disclosure relates to a display device, an image display method, and a storage medium storing an image display program.

BACKGROUND

There has conventionally been known a display device in which a translucent touch panel and a display panel capable of displaying various images are arranged in superimposition and which allows a touch operation to be performed on an image display region. A related-art display device is configured such that, on an organic light emitting diode (OLED) panel, a capacitive touch panel sharing a part of an electrode included in a display element is superimposed, and a touch operation can be performed on an image display region. Note that the OLED panel is referred to also as an organic EL (electroluminescence) panel.

SUMMARY

A display device includes: a display including a display portion which is a region where an image is to be displayed and an operation portion which is a region disposed to be inclined with respect to a virtual plane formed by the display portion and capable of allowing image display and a touch operation to be performed thereon; and a control unit that controls image display on the display. The control unit executes display control which is at least one of first display control of causing the operation portion to display the notification or second display control of causing the display portion to display an image corresponding to the touch operation.

DETAILED DESCRIPTION

Figure 1:
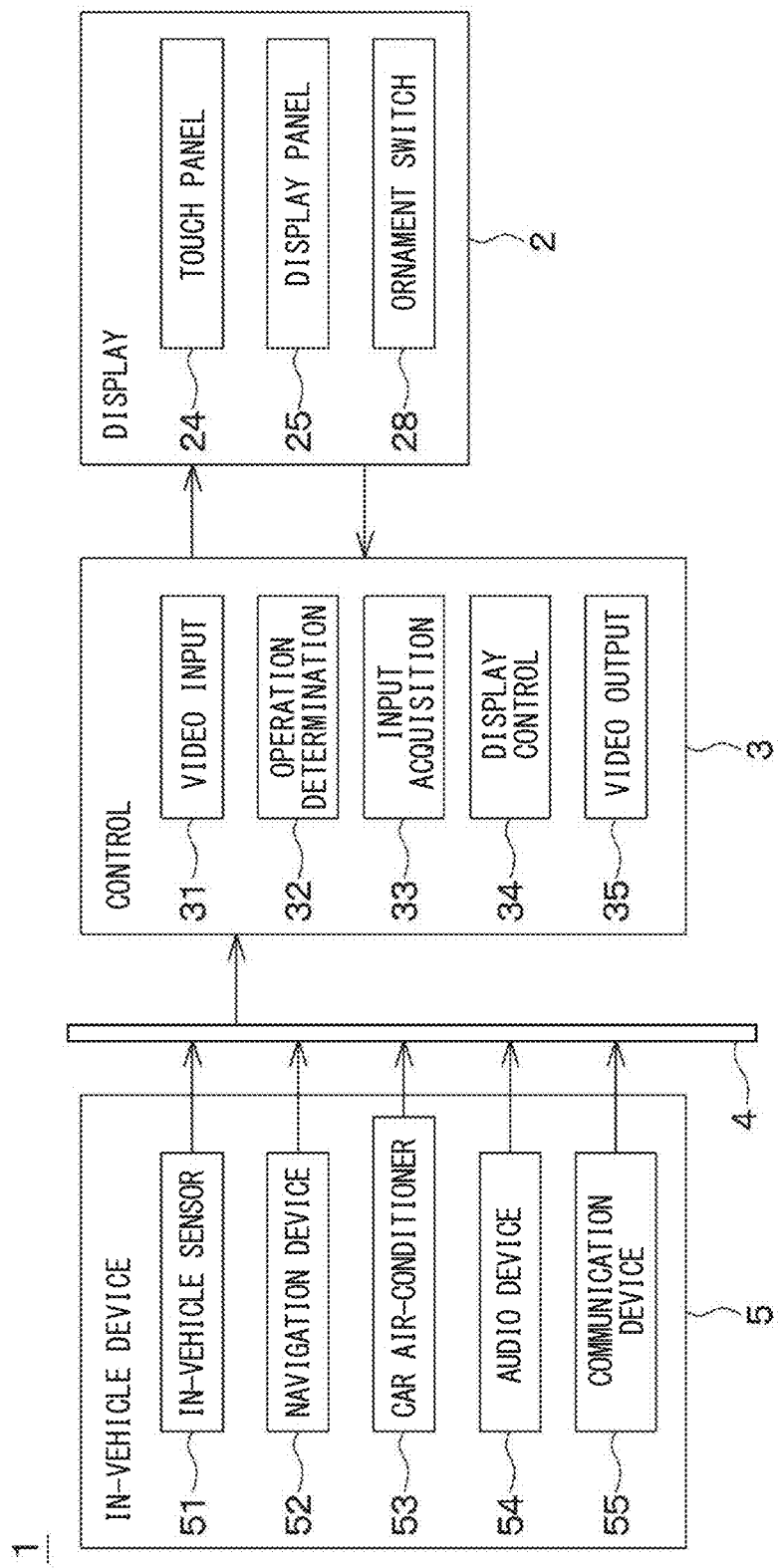
FIG. 1 is a block diagram illustrating an example of a display system according to an embodiment.

In recent years, in the field of this type of display device, the application of the display device to an in-vehicle use in which the display device is mounted in a vehicle, such as an automobile, has been promoted and, in such a situation in which it is difficult to constantly attentively look at a display screen, an easy touch operation is required. Additionally, in such a use, when a touch operation is performed by a user or there is a notification from a displayed content or the like, the display device is required to cause the user to clearly perceive that the operation is performed or the notification is made to the user. However, in a two-dimensional display device in which a display portion that mainly displays an image and an operation portion that performs image display and is mainly used for a touch operation by a user are located in the same plane, it is difficult to satisfy these requirements.

The present disclosure relates to a display device that allows an easy touch operation and allows, even when it is difficult for a user to constantly attentively look at a screen, the user to perceive a notification to the user or completion of execution of an operation by the user. The present disclosure also relates to an image display method and an image display program which allow the user to perceive the notification to the user or the like in the same situation.

According to an aspect of the present disclosure, a display device comprises: a display including a display portion which is a region where an image is to be displayed, and an operation portion which is a region disposed to be inclined with respect to a virtual plane formed by the display portion and capable of allowing image display and a touch operation to be performed thereon; and a control unit that controls display of an image on the display. The control unit executes display control which is at least one of: first display control of causing, when a notification is made to a user, a transfer of the notification from the display portion to the operation portion and causing the operation portion to display the notification; or second display control of causing, when the touch operation is performed by the user on the operation portion, a transfer of an image corresponding to the touch operation from the operation portion to the display portion and causing the display portion to display the image corresponding to the touch operation.

This display device has a configuration in which the operation portion has the display disposed to be inclined with respect to the virtual plane formed by the display portion and consequently, when the display portion is in an orientation at an angle at which the display portion is easily visually recognizable, the operation portion is placed at a position where the user easily places his or her hand on the operation portion, resulting an easy touch operation. In addition, in the display device, the control unit that controls display on the display performs display control which is at least one of "at the time of a notification to the user, display of the notification is moved from the display portion to the operation portion" or "at the time of a touch operation, display of a predetermined image is moved from the operation portion to the display portion". Thus, the display device causes an image transfer between two regions, which are the display portion and the operation portion, and therefore it is possible to allow to more clearly perceive the notification to the user or the completion of the operation.

According to another aspect of the present disclosure, an image display method is an image display method in a display device including a display including a display portion which is a region where an image is to be displayed, and an operation portion which is a region disposed to be inclined with respect to a virtual plane formed by the display portion and capable of allowing image display and a touch operation to be performed thereon. The image display method comprises: executing display which is at least one of: first display of causing, when a notification is made to a user, a transfer of the notification from the display portion to the operation portion and causing the operation portion to display the notification; or second display of causing, when the touch operation is performed by the user on the operation portion, a transfer of an image corresponding to the touch operation from the operation portion to the display portion and causing the display portion to display the image corresponding to the touch operation.

The image display method implements display which is at least one of "at the time of a notification to the user, display of the notification is moved from the display portion to the operation portion" or "at the time of a touch operation, the display of a predetermined image is moved from the operation portion to the display portion". Thus, the display method causes an image transfer between two regions, which are the display portion and the operation portion, and therefore it is possible to allow the user to more clearly perceive the notification to the user or the completion of the operation by the user.

According to another aspect of the present disclosure, an image display program in a display device including a display including a display portion which is a region where an image is to be displayed and an operation portion which is a region disposed to be inclined with respect to a virtual plane formed by the display portion and capable of allowing image display and a touch operation to be performed thereon is provided. The image display program comprises: instructions for executing display which is at least one of: first display of causing, when a notification is made to a user, a transfer of the notification from the display portion to the operation portion and causing the operation portion to display the notification; or second display of causing, when the touch operation is performed by the user on the operation portion, a transfer of an image corresponding to the touch operation from the operation portion to the display portion and causing the display portion to display the image corresponding to the touch operation.

The image display program implements display which is at least one of "at the time of a notification to the user, display of the notification is moved from the display portion to the operation portion" or "at the time of a touch operation, the display of a predetermined image is moved from the operation portion to the display portion". Thus, the display program is configured such that, an image transfer between two regions, which are the display portion and the operation portion, and therefore it is possible to allow the user to more clearly perceive the notification to the user or the completion of the operation by the user.

The following will describe embodiments of the present disclosure with reference to the accompanying drawings. In the following embodiments, the elements in one embodiment are identical to or equivalent with those in another embodiment, the same reference symbols are used to refer the same elements.

Embodiment

Referring now the drawings, a description will be given of a display system 1 to which a display device in an embodiment is applied. In the present description, a description will be given by using a case where the display system 1 is applied to an in-vehicle display system to be mounted in a vehicle, such as an automobile, as a representative example, but the display system 1 is not limited to this use. The display system 1 may also be preferably adopted for a use in which, e.g., the display system 1 is used in a situation in which it is difficult to constantly attentively look at a display 2 described later, such as an in-vehicle use, but can be adopted for another use as a matter of course.

Figure 2:
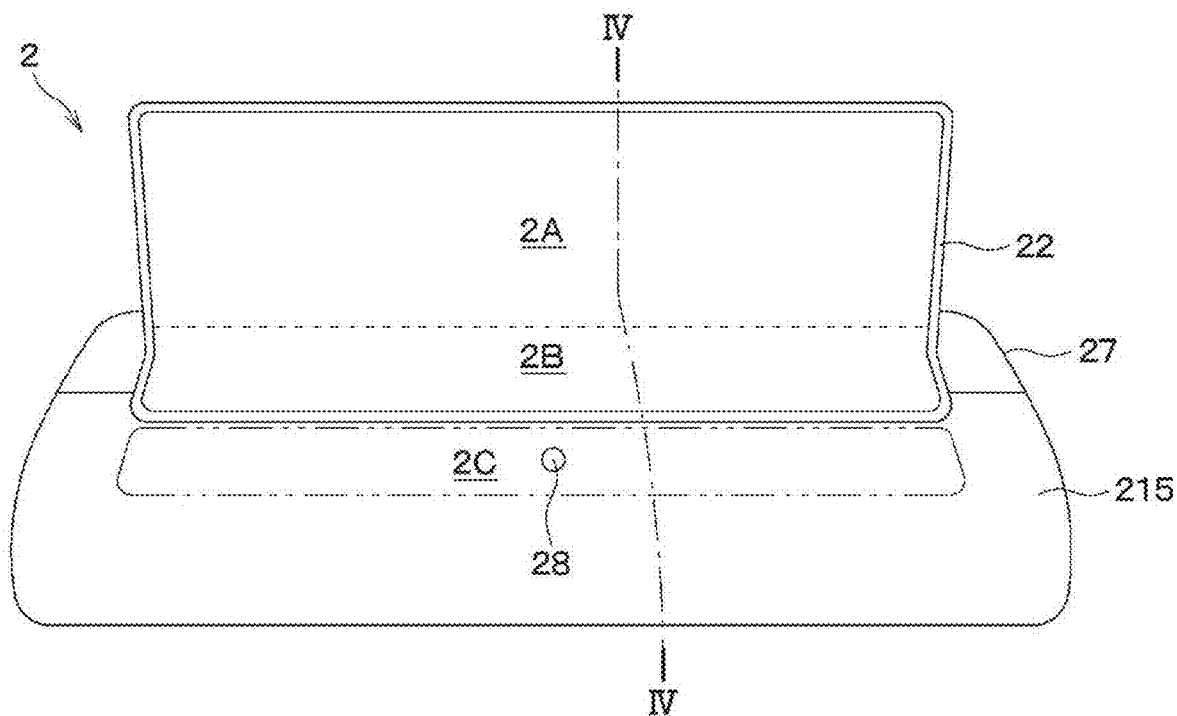
FIG. 2 is a diagram illustrating an example of a display having a display portion and an operation portion.
Figure 3:
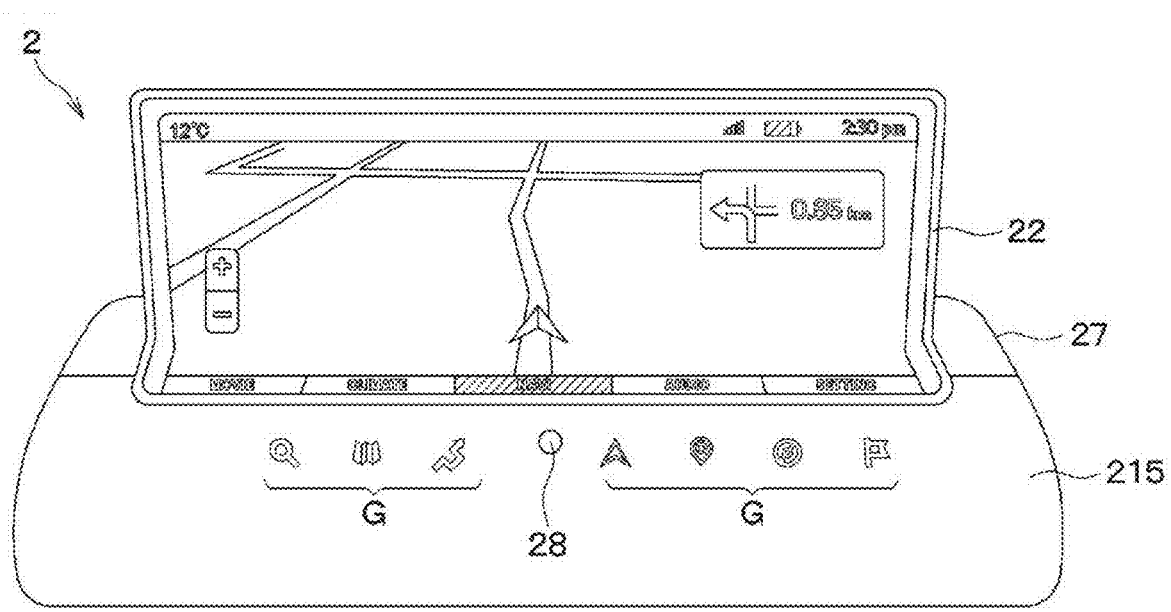
FIG. 3 is a diagram illustrating an example of image display on the display portion and the operation portion of the display.
Figure 6:
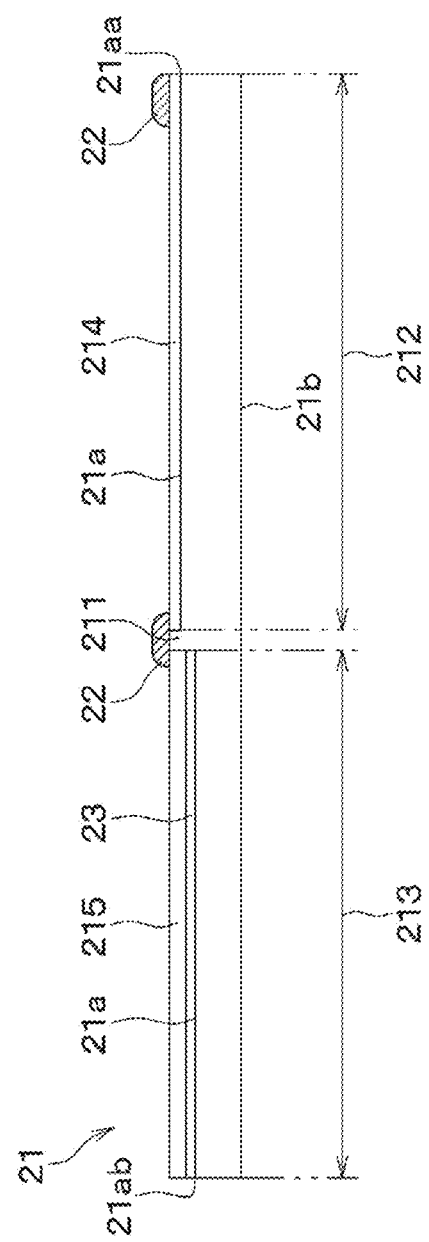
FIG. 6 is a diagram illustrating a configuration of a transparent cover of the display and a bezel.

In FIG. 2, for easy understanding of a positional relationship between a display portion 2A, an intermediate portion 2B, and an operation portion 2C of a display 2, which will be described later, a rough boundary between the display portion 2A and the intermediate portion 2B and a rough outline of the operation portion 2C are respectively indicated by a broken line and a two-dot-dash line for the sake of convenience. In FIG. 3, a portion of an image displayed on the display 2 is hatched, but the hatching does not indicate a cross section. In FIG. 6, for easy understanding of a configuration of a transparent cover 21 described later, the transparent cover 21 in a flat plate state is illustrated for the sake of convenience.

(Outline of Display System)

As illustrated in, e.g., FIG. 1, the display system 1 in the present embodiment is configured to include the display 2, a control unit 3, an in-vehicle LAN 4, and an in-vehicle device 5. The LAN is an abbreviation of Local Area Network. The display system 1 is configured such that, e.g., various signals from the in-vehicle device 5, such as a video signal, and an output signal from a touch panel 24 mounted on the display 2 or the like are input to the control unit 3, and the control unit 3 controls display on the display 2 on the basis of these signals.

The display 2 is configured to be able to display, e.g., an image and a video corresponding to various contents on the basis of the video signal and the various signals input thereto from the in-vehicle device 5 or the like and allow the user to perform a touch operation thereon. The display 2 is configured to allow the various signals to be input/output to/from the control unit 3 and allow the control unit 3 to perform display control. Details of the display 2 will be described later.

The control unit 3 corresponds to a display control device that controls the display of an image on the display 2. The control unit 3 is configured to include a microcomputer including, e.g., a CPU, a ROM, a RAM, an I/O, and the like. The control unit 3 receives, e.g., the various signals input thereto from the display 2 and the in-vehicle device 5, reads various programs and data stored on a recording medium not shown on the basis of the signals, and controls display on the display 2. The control unit 3 is configured to include, e.g., a video input unit 31, an operation determination unit 32, an input acquisition unit 33, a display control unit 34, and a video output unit 35.

For example, the video input unit 31 generates image data on the basis of the video signal directly from the in-vehicle device 5 or through the in-vehicle LAN 4, and outputs the image data to the display control unit 34. For example, the image data generated by the video input unit 31 is input to the video output unit 35 via the display control unit 34, but may also be input directly to the video output unit 35.

For example, the operation determination unit 32 determines the presence or absence of an operation performed by the user on the operation portion 2C of the display 2 described later on the basis of the presence or absence of an output signal from an ornament switch 28 of the display 2 described later. For example, the operation determination unit 32 outputs a signal according to a determination result to the display control unit 34.

For example, the input acquisition unit 33 acquires an input signal based on the touch operation performed by the user on the display 2, and outputs a signal according to the input signal to the display control unit 34. For example, to the input acquisition unit 33, electric signals resulting from touch operations performed by the user on respective regions of the display portion 2A, the intermediate portion 2B, and the operation portion 2C of the display 2, which will be described later, are input.

For example, the display control unit 34 executes display control described later on the display 2 on the basis of the various signals input thereto from the video input unit 31, the operation determination unit 32, and the input acquisition unit 33. For example, when executing the display control, the display control unit 34 corrects the image data from the video input unit 31, and outputs the corrected image data.

For example, the video output unit 35 outputs the video signals corresponding to various images or the like to the display 2. For example, when executing the display control, the video output unit 35 outputs the video signals corresponding to the image data after corrected by the display control unit 34 to the display 2 and, when not executing the display control, the video output unit 35 outputs the video signals corresponding to the image data generated by the video input unit 31 to the display 2. Note that details of the display control by the control unit 3 will be described later.

The in-vehicle LAN 4 is an in-vehicle communication bus to be mounted in a host vehicle in which the display system 1 is mounted (hereinafter referred to simply as the "host vehicle") to connect the control unit 3 and the in-vehicle device 5, and allows communication between the control unit 3 and the in-vehicle device 5.

The in-vehicle device 5 is configured to include various electronic devices, sensors, and the like for inputting, to the control unit 3, the various signals such as the video signal, vehicle information of the host vehicle, and the like. As illustrated in, e.g., FIG. 1, the in-vehicle device 5 is configured to include an in-vehicle sensor 51, a navigation device 52, a car air-conditioner 53, an audio device 54, a communication device 55, and the like, but the components thereof are not limited thereto. For example, the in-vehicle device 5 may include, in addition to the above-mentioned components, another in-vehicle electronic device, such as a vehicle ECU, or may also include only any part of the above-mentioned components, and the components thereof may appropriately be changed.

For example, the in-vehicle sensor 51 is any sensor that outputs an electric signal according to a physical quantity applied thereto, such as a temperature sensor, an illuminance sensor, a gyro sensor, a pressure sensor, or an ultrasonic sensor, but is not limited thereto. The navigation device 52 inputs, to the control unit 3, video signals representing such videos as those of a current position of the host vehicle and a map and those related to, e.g., destination setting and information on facilities and shops around the vehicle and around a destination on the basis of, e.g., map information recorded in a map database and on the basis of an operation by the user. In addition, the navigation device 52 may acquire information related to, e.g., a latitude and a longitude of the vehicle, a current time, and a direction in which the vehicle is facing by using a known GPS and input these information items to the control unit 3. The GPS is an abbreviation of Global Positioning System. For example, the car air-conditioner 53 is an air-conditioning device to be used to control air-conditioning of the host vehicle, and inputs video signals corresponding to a set temperature and an air volume on the basis of an operation by the user. For example, the audio device 54 records music, a sound/voice, and data related thereto, while inputting video signals corresponding to the data to the control unit 3. For example, the communication device 55 performs communication with an external network, such as the Internet, by wireless communication to acquire various information and input video signals corresponding thereto to the control unit 3.

Note that the in-vehicle device 5 inputs various signals to the control unit 3 via the in-vehicle LAN 4, but is not limited thereto, and may also be configured to input the various signals and the like directly to the control unit 3.

The foregoing is a basic configuration of the display system 1. The display system 1 has the display 2, which will be described next, to thereby allow an easy touch operation and is under the display control executed by the control unit 3 to thereby allow the user to perceive a notification to the user or the like and completion of an operation by the user even when the user is not attentively looking at the display 2. Note that "the user is not attentively looking at the display 2" mentioned herein means a situation in which the user is not focused on the display 2, but the display 2 is present in a peripheral vision of the user.

(Display)

As illustrated in, e.g., FIG. 2, the display 2 includes a housing 27 and a bezel 22 surrounding a portion of the housing 27. The display 2 has a region surrounded by the bezel 22 which serves as the display portion 2A and the intermediate portion 2B, while having a local region external of the bezel 22 and adjacent to the intermediate portion 2B which serves as the operation portion 2C. As illustrated in, e.g., FIG. 3, the display 2 is configured to be able to display various images on each of the regions of the display portion 2A, the intermediate portion 2B, and the operation portion 2C.

Figure 4:
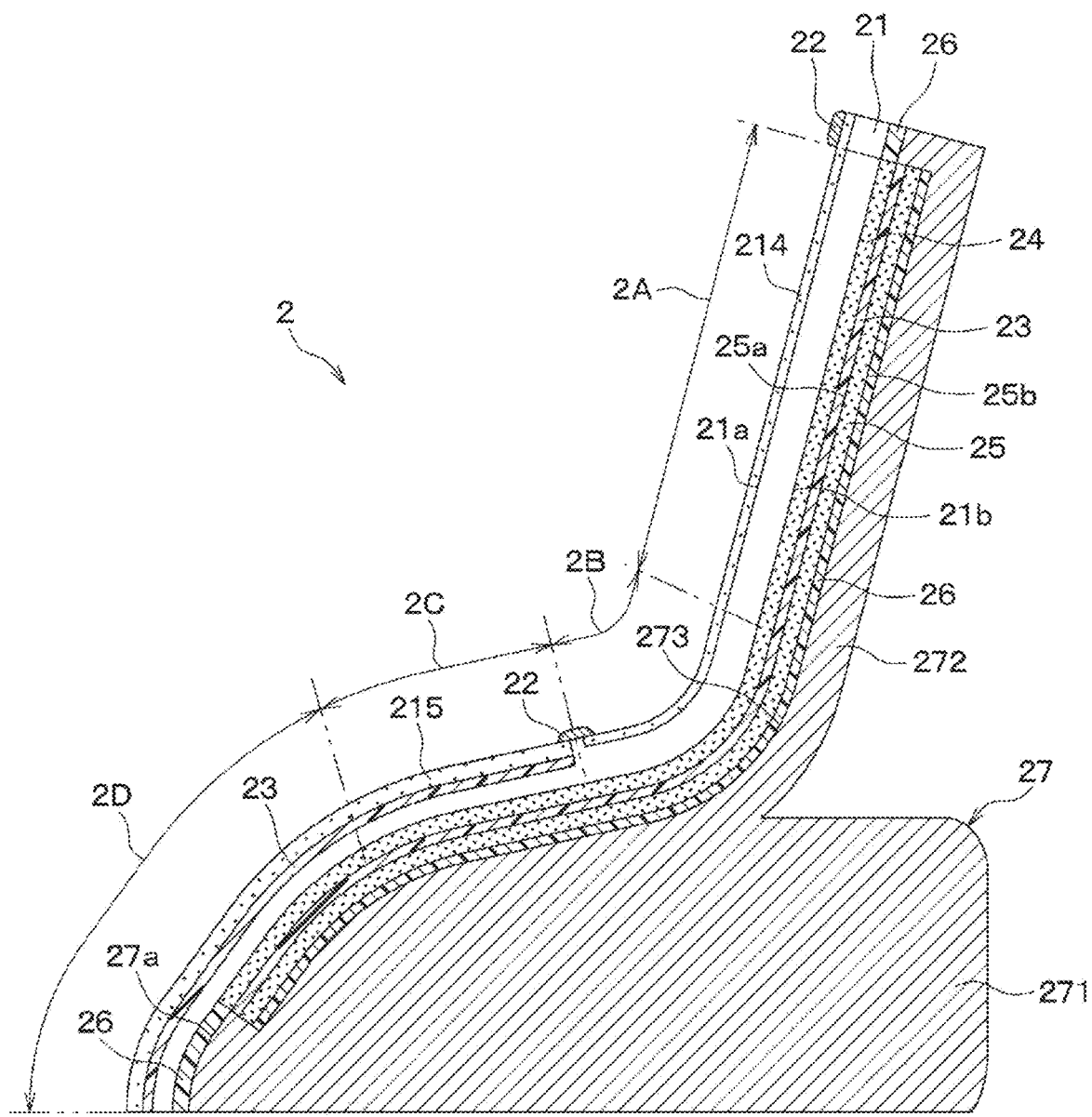
FIG. 4 is a cross-sectional view illustrating a cross-sectional configuration along a line IV-IV in FIG. 2.

As illustrated in, e.g., FIG. 4, the display 2 further includes the transparent cover 21, an optical adhesion layer 23, the touch panel 24, a display panel 25, and a back-surface adhesion layer 26. For example, in the display panel 2, on another surface 21b of the transparent cover 21 located on the housing 27 side, the touch panel 24 and the display panel 25 are stacked in this order to be bonded thereto. For example, in the display 2, the other surface 21b of the transparent cover 21 and the display panel 25 are bonded to the housing 27 via the back-surface adhesion layer 26, and the transparent cover 21 has a three-dimensional shape having a planar portion and a curved portion each following the housing 27. For example, the display 2 is configured such that, when the display 2 is in an orientation in which the display portion 2A is located on an upper end thereof, the display portion 2A, the intermediate portion 2B, the operation portion 2C, and a curvature varying portion 2D are positioned in this order in a direction from the upper end to a lower end thereof.

For example, the display portion 2A is a region which is placed in a substantially planar state to mainly display images, videos, and the like of contents corresponding to various electronic devices to which the display 2 is connected. The intermediate portion 2B is a region located in a portion connecting the display portion 2A and the operation portion 2C to be able to display various images and the like, similarly to the display portion 2A. The operation portion 2C is a region located opposite to the intermediate portion 2B with respect to the bezel 22 interposed therebetween to display at least icons G corresponding to the various electronic devices to which the display 2 is connected and allow the user to perform the touch operation on a position where the icons G are displayed. In other words, the operation portion 2C is the region located outside the frame-shaped bezel 22 described later and used mainly for the touch operation by the user. The curvature varying portion 2D is a region located outside the operation portion 2C and opposite to the bezel 22, and has a curved surface at least a portion of which has a varying radius of curvature.

Figure 5:
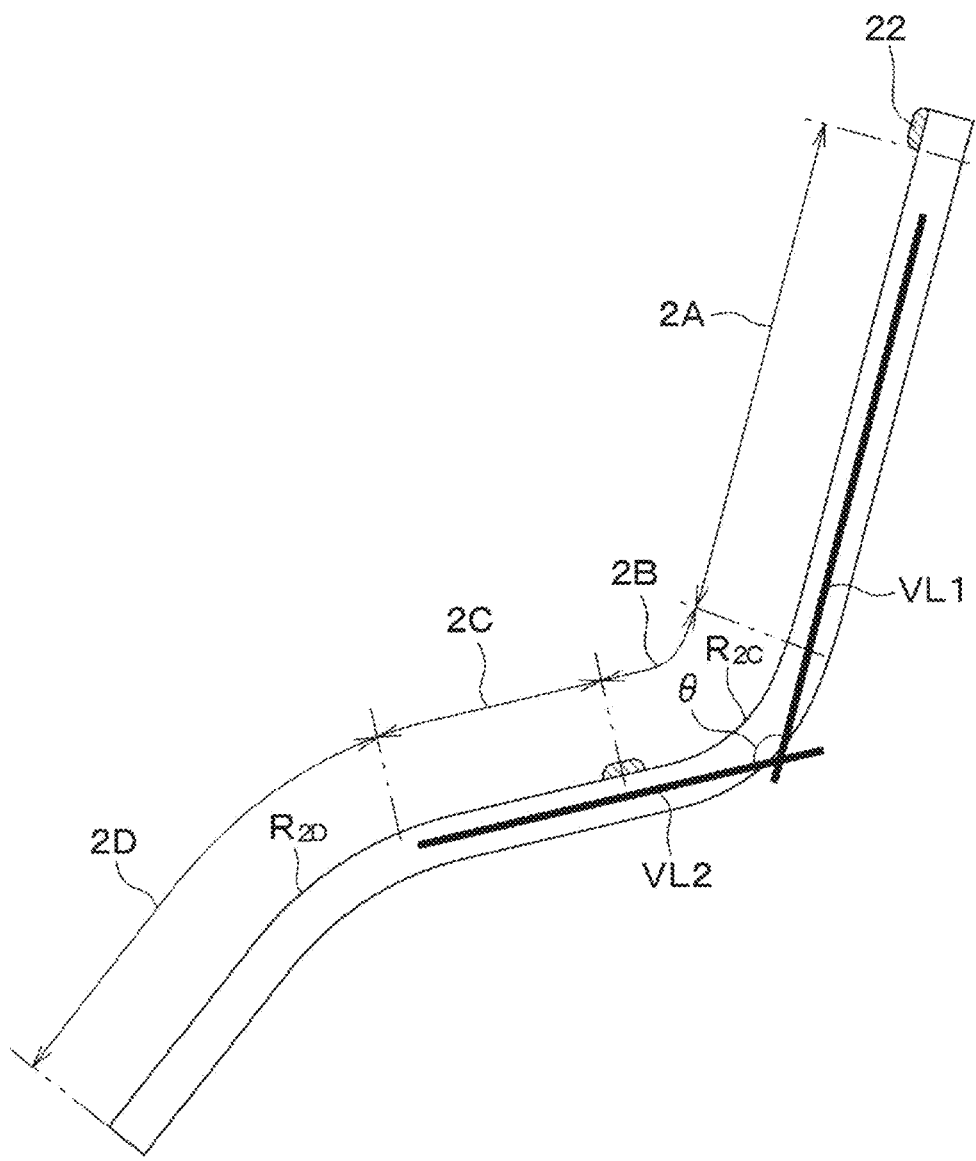
FIG. 5 is an illustrative view for illustrating a layout relationship between the display portion and the operation portion of the display.

As illustrated in, e.g., FIG. 5, the display 2 is configured such that a predetermined angle θ is formed between the display portion 2A and the operation portion 2C. Specifically, in the display 2, the angle θ formed between a first virtual straight line VL1 along a first virtual plane formed by the display portion 2A and a second virtual straight line VL2 along a second virtual plane formed by the operation portion 2C is in a range of, e.g., 110 degrees to 130 degrees, though not limited thereto. As a result, in the display 2, when the display portion 2A is in an orientation at an angle at which the display portion 2A is easily viewable by the user, the operation portion 2C is placed at a position where the user easily places his or her hand thereon to allow both a visibility of an image on the display portion 2A and an operability on the operation portion 2C to be achieved. Note that the entire region of the operation portion 2C may be substantially planar or only a local region thereof adjacent to the intermediate portion 2B may be substantially planar.

As illustrated in, e.g., FIG. 5, a portion of the intermediate portion 2B which corresponds to a position of an intersection between a surface formed by the display portion 2A and a surface formed by the operation portion 2C is a most curved portion. The intermediate portion 2B has a radius of curvature $R_{2C}$ at the curved portion which is, e.g., 20 mm to 30 mm. The curvature varying portion 2D has a shape in which a radius of curvature $R_{2D}$ of the curved portion continuously varies within a range of, e.g., 70 mm to 100 mm, and is configured such that, when the user places his or her hand on the operation portion 2C, the hand of the user is not interfered therewith.

Note that the display portion 2A, the intermediate portion 2B, and the operation portion 2C are mainly formed of the one transparent cover 21 described later, the one touch panel 24 bonded thereto, and the one display panel 25 to form one continuous surface. In addition, the display portion 2A, the intermediate portion 2B, and the operation portion 2C allow image display and the touch operation to be performed on the respective regions thereof.

The transparent cover 21 is a transparent member having a one surface 21a and the other surface 21b which are in front-back relation, and is formed of a translucent material such as a resin or glass. For example, the transparent cover 21 has a thickness of 1 mm or less when formed of glass, while having a thickness of 1 to 2 mm when formed of a resin, to have flexibility. For example, the transparent cover 21 is bonded to the housing 27 via the back-surface adhesion layer 26, and has a curved shape having the planar portion and the curved portion each following the housing 27. As illustrated in, e.g., FIG. 6, the transparent cover 21 has a protruding portion 211 provided on the one surface 21a.

For explanatory convenience, both ends of the one surface 21a of the transparent cover 21 in a longitudinal direction are hereinafter referred to as "one end 21aa" and "another end 21ab". In addition, a region from the protruding portion 211 to the one end 21aa is referred to as a "first region 212", while a region from the protruding portion 211 to the other end 21ab is referred to as a "second region 213".

For example, the protruding portion 211 is formed by performing cutting or milling on one surface of a transparent base material included in the transparent cover 21 by using an NC working machine to extend along a direction perpendicular to the longitudinal direction. The NC is an abbreviation of Numerically Control.

The transparent cover 21 has a configuration in which the first region 212 is located in the display portion 2A and the intermediate portion 2B, while the second region 213 is located in the operation portion 2C and the curvature varying portion 2D. For example, an antireflection film 214 is bonded to the first region 212 of the transparent cover 21, while a decorative member 215 is bonded to the second region 213 of the transparent cover 21 via the optical adhesion layer 23. The transparent cover 21 has the substantially the same thickness in the protruding portion 211, the first region 212, and the second region 213. The transparent cover 21 has a configuration in which a depth of the first region 212 matches respective thicknesses of the antireflection film 214 and an optical adhesive not shown and also matches respective thicknesses of the decorative member 215 and the optical adhesion layer 23. Thus, the transparent cover 21 has a configuration in which no level difference is produced between the protruding portion 211 and each of the first region 212 and the second region 213 and which allows the bezel 22 to be easily bonded thereto.

For example, as the antireflection film 214, a known antireflection film is used to be bonded to the first region 212 via an optical adhesive not shown. The antireflection film 214 suppresses external light reflection by the display portion 2A and the intermediate portion 2B to further improve the visibility of an image. The antireflection film 214 has an end portion thereof adjacent to the protruding portion 211 and covered with the bezel 22.

As the decorative member 215, e.g., a known decorative film is used, and the decorative member 215 has a transparent base material and a decorative layer deposited by printing, vapor deposition, or the like and not shown to make visible an appearance thereof different from a configuration on a side of the transparent cover 21 closer to the housing 27 and improve design of the operation portion 2C and the curvature varying portion 2D. For example, the decorative member 215 is a translucent member which has any appearance, such as metallic or woody appearance, provided by the decorative layer not shown when viewed from the outside and transmits light from the display panel 25 to the outside. In other words, the decorative member 215 is configured to have any appearance and allow various GUIs related to touch operations, which are images displayed on the display panel 25, to be visually recognized. The GUI is an abbreviation of Graphical User Interface. While the operation portion 2C is inclined at the predetermined angle θ with respect to the display portion 2A to increase the likelihood of occurrence of the external light reflection by the operation portion 2C, the decorative member 215 allows the decorative layer to successfully suppress deterioration of the visibility due to the external light reflection, and also functions to improve the visibility at the operation portion 2C. Note that the decorative member 215 is configured to, e.g., transmit visible light from the display panel 25 at a transmittance of, e.g., 90%, but is not limited thereto. The decorative member 215 needs only to allow the various GUIs to be visually recognized, and the transmittance may be varied as appropriate. In addition, the decorative member 215 has an end portion thereof adjacent to the protruding portion 211 and covered with the bezel 22.

The bezel 22 is a frame-body-shaped member disposed on the one surface 21a side of the transparent cover 21, and is formed of any material such as, e.g., a resin, metal, or a composite thereof. The bezel 22 surrounds the display portion 2A and the intermediate portion 2B to allow the user to easily visually recognize a main image display region. For example, similarly to the decorative member 215, the bezel 22 is configured to allow any appearance, such as metallic appearance, to be visually recognized. As illustrated in, e.g., FIG. 6, the bezel 22 is disposed such that a portion thereof entirely covers the protruding portion 211 included in the transparent cover 21 and boundaries between the protruding portion 211 and the antireflection film 214 and the decorative member 215 each included therein. In other words, the bezel 22 covers not only the protruding portion 211, but also an end portion of the decorative member 215 which is adjacent to the intermediate portion 2B and an end portion of the antireflection film 214 which is adjacent to the operation portion 2C to hide the boundaries therebetween and thereby also function to improve the appearance. For example, the bezel 22 is bonded to the transparent cover 21 via an adhesive not shown or the like.

For example, the optical adhesion layer 23 is an optical adhesive such as OCA or OCR. The OCA is an abbreviation of Optical Clear Adhesive, and the OCR is an abbreviation of Optical Clear Resin. For example, the optical adhesion layer 23 is disposed on a side closer to the transparent cover 21 than the display surface 25a of the display panel 25 which displays an image to transmit image light from the display panel 25 and bond the constituent members of the display 2 together. For example, the optical adhesion layer 23 is disposed between the transparent cover 21 and the antireflection film 214, between the decorative member 215 and the touch panel 24, and between the touch panel 24 and the display panel 25 to bond these members together.

For example, the touch panel 24 is configured such that a pair of transparent electrodes made of ITO (indium tin oxide) or the like are stacked on a transparent base material having translucency and flexibility to be arranged to face each other via an insulating layer. For example, the touch panel 24 has a touch sensor that outputs an electric signal corresponding to a touch operation portion in response to a change in electrostatic capacitance resulting from deformation due to approach or contact of a dielectric body, such as a finger of the user, to or with the patterned transparent electrodes. The touch panel 24 is bonded to the other surface 21b of the transparent cover 21 via an optical adhesive not shown, while having a curved shape following the housing 27 together with the transparent cover 21.

For example, the display panel 25 is an OLED panel having a flexible configuration having flexibility. For example, in a case of the OLED panel, the display panel 25 has a configuration in which circuit wiring having thin-film transistors (TFTs) and OLED elements forming pixels are stacked in this order on a substrate made of a flexible resin material, and each of the pixels is drive-controlled by the TFT. For example, the display panel 25 is disposed across the respective regions of the display portion 2A, the intermediate portion 2B, and the operation portion 2C to display the various images, the GUIs, and the like corresponding to the individual regions. For example, when an area corresponding to a 12.3 inch (31.242 cm) size is intended to be ensured for a display region on the display portion 2A, the display panel 25 is provided with a two-dimensional size corresponding to a 14 inch (35.56 cm) size. Note that the two-dimensional size corresponding to the 14 inch size is 30.94 cm in width×17.42 cm in length when a width-to-length ratio is 16:9. Note that the size of the display panel 25 is not limited to that in the foregoing example, and may appropriately be changed.

For example, the display panel 25 is connected to a circuit substrate not shown via wiring made of FPC or the like and not shown and subjected to various display control. The FPC is an abbreviation of Flexible Printed Circuits. For example, the circuit substrate not shown is an electronic control unit including a power source circuit, a cooling fan, a CPU, a ROM, a RAM, and an I/O which are mounted on a wiring substrate, and is disposed inside or outside the housing 27. For example, the circuit substrate not shown is connected to the display panel 25 via wiring extending through an opening portion not shown in a bottom surface of a recessed portion 273 in the housing 27, which will be described later. Note that placement of the circuit substrate and the wiring each not shown or the like in the display 2 is not limited to that in the example described above, and may appropriately be changed.

Note that the display panel 25 needs only to have a flexible configuration capable of displaying various images, is not limited to the OLED panel, and may also be another display panel. Since configurations of the OLED panel and other display panels, materials used therefor, and the like are well known, a detailed description thereof is omitted in the present description.

For the back-surface adhesion layer 26, e.g., a typical adhesive such as an acrylic type, a urethane type, or a silicone type or a double-side tape may be used. The back-surface adhesion layer 26 is placed on a region of the other surface 21b of the transparent cover 21 which is located outside the touch panel 24 or on a back surface 25b of the display panel 25 to bond the housing 27 and these members together.

As illustrated in, e.g., FIG. 4, the housing 27 is a member which has a base portion 271, a support portion 272, and the recessed portion 273 and to which the transparent cover 21 and the display panel 25 are to be bonded via the back-surface adhesion layer 26. The housing 27 is formed of, e.g., a metal material having a high heat conductivity such as Al (aluminum) or Mg (magnesium), an alloy material thereof, a light-weight resin material, or the like to function as a heat dissipation member that dissipates heat from the display panel 25 to the outside.

For example, in the housing 27, in the base portion 271 and the support portion 272, the recessed portion 273 serving as a space which prevents interference with each of the touch panel 24 and the display panel 25 to be bonded to the transparent cover 21 is formed. For example, of the bottom surface of the recessed portion 273, at least a portion located in the display portion 2A and a local region of a portion located in the operation portion 2C which is adjacent to the intermediate portion 2B are each provided as a planar surface. The housing 27 has a configuration in which the base portion 271 supports the operation portion 2C and the curvature varying portion 2D, and the support portion 272 supports the display portion 2A and the intermediate portion 2B. Of the base portion 271, for example, a portion supporting the operation portion 2C is at an angle in a range of 110 degrees to 130 degrees with respect to a virtual surface formed by the support portion 272 such that an angle formed between a surface formed by the display portion 2A and a surface formed by the operation portion 2C falls within a range of 110 degrees to 130 degrees. For example, the base portion 271 has a curved shape in which a radius of curvature of a portion supporting the curvature varying portion 2D continuously varies within a range of 70 mm to 100 mm. For example, the base portion 271 is configured to have an inner space not shown which is capable of containing various electronic components to be connected to the display panel 25, such as the wiring and the circuit substrate not shown.

For example, the ornament switch 28 is any switch member disposed in the region of the operation portion 2C to output a signal in response to contact or approach of an operating body such as a finger of the user. When, e.g., touched by the user, the ornament switch 28 outputs a signal to the control unit 3, and is used to display various GUIs corresponding to the ornament switch 28 on the operation portion 2C. For example, the ornament switch 28 is a member separate from the touch panel 24, and is placed on the uppermost surface of the transparent cover 21. As illustrated in FIG. 2, the one ornament switch 28 may be placed, or a plurality of the ornament switches 28 may also be placed. The number and locations of the ornament switches 28 may appropriately be changed.

The foregoing is a basic configuration of the display 2. Note that the display 2 may be or may not be configured such that image display and a touch operation can also be performed on the curvature varying portion 2D.

(Control Unit and Display Control)

Next, referring to FIG. 7 to FIG. 13, a description will be given of control of display on the display 2 which is executed by the control unit 3.

Figure 7:
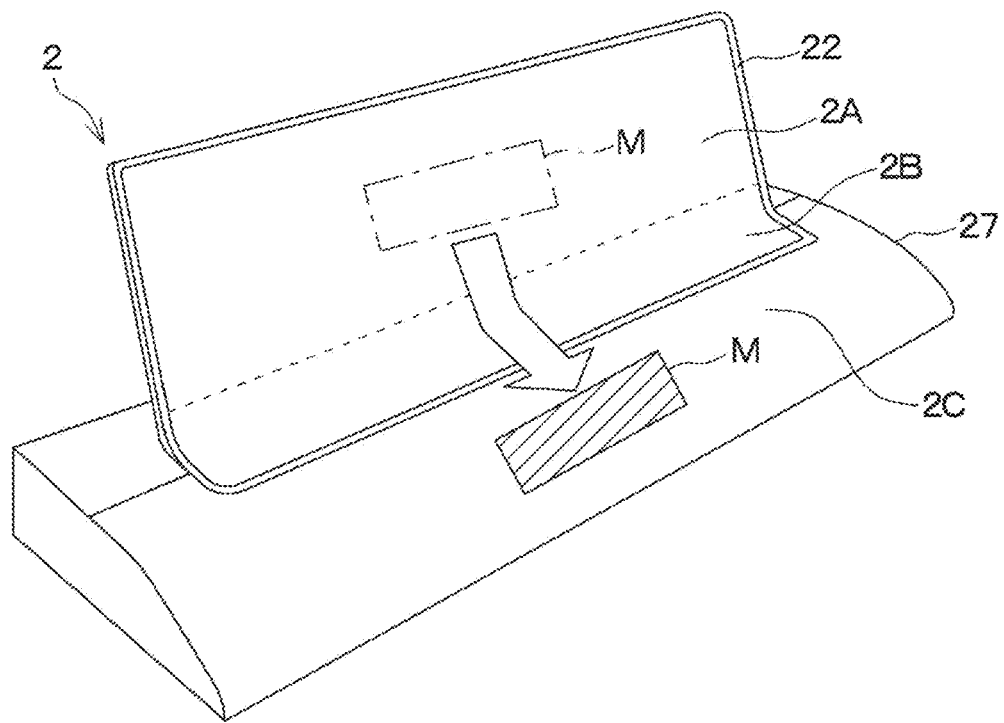
FIG. 7 is an illustrative view for illustrating first display control on the display.
Figure 9:
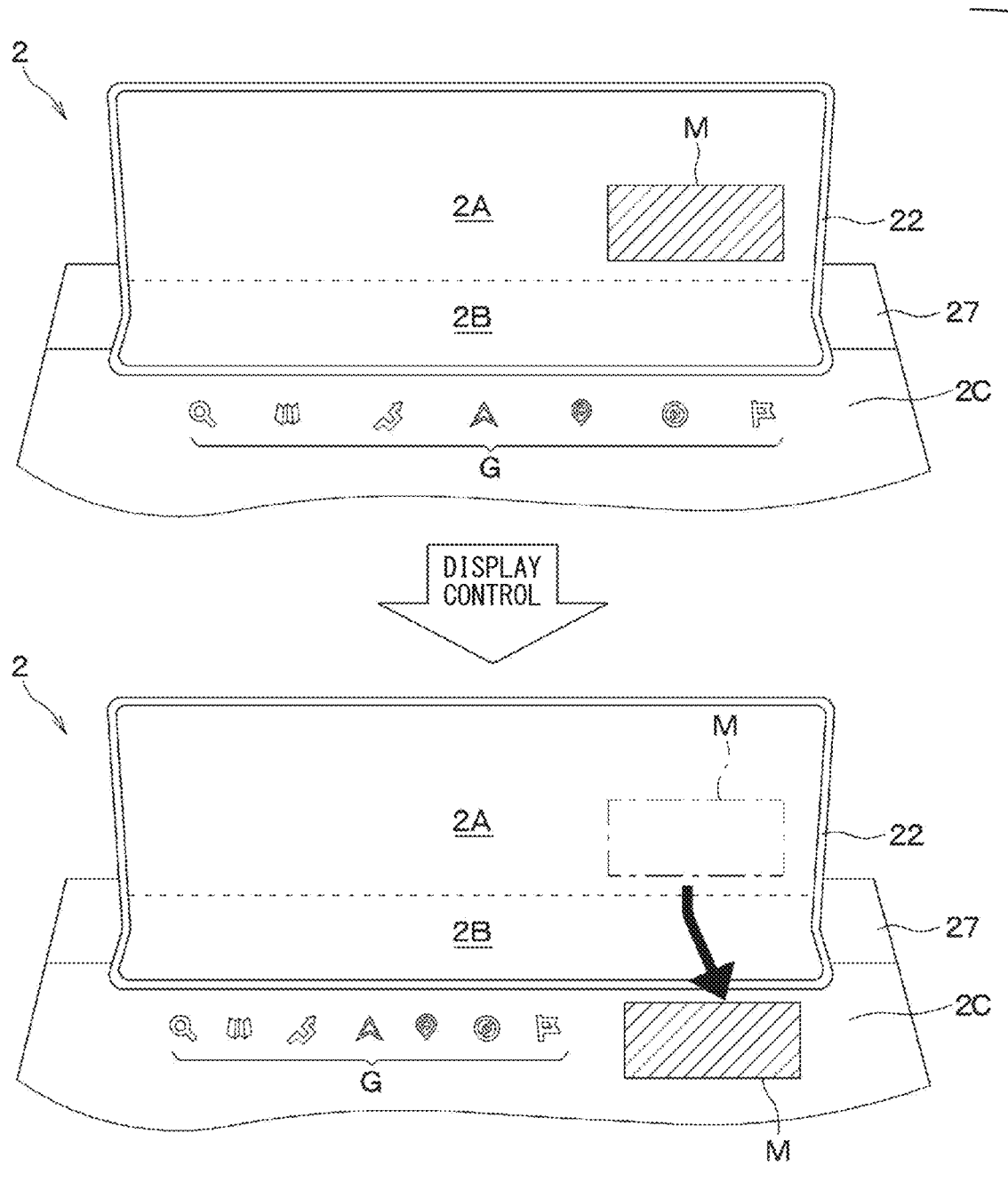
FIG. 9 is a diagram illustrating an example of display of a message portion on the operation portion in the first display control.
Figure 10:
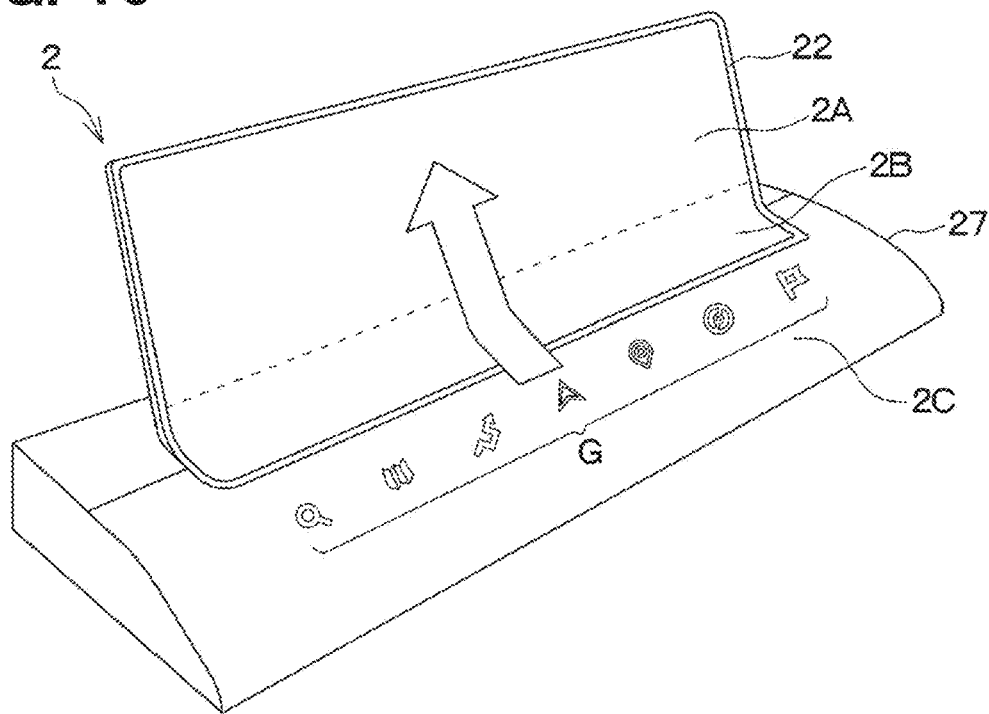
FIG. 10 is an illustrative view for illustrating second display control on the display.

Note that, in FIG. 7, to allow easy understanding of first display control subsequently described, an outline of a message portion M described later before a transfer is indicated by a dot-dash line, while an outline thereof after the transfer is indicated by a solid line. In FIG. 7 and FIG. 10, to allow easy understanding of movement of an image displayed on the display 2, a direction of the movement is indicated by a hollow arrow. In FIG. 9, movement of the message portion M over the display 2 is indicated by a thick-line arrow. For ease of viewing, in each of FIG. 7, FIG. 9, FIG. 11, and FIG. 13, a portion of the image displayed on the display 2 is hatched, but the hatching does not indicate a cross section.

First, a description will be given of the first display control. The first display control is executed when a notification to the user is displayed on the display portion 2A of the display 2. Note that the notification to the user is not limited, and examples thereof include information related to various contents for the in-vehicle device 5 or the like, information that needs to be transmitted to the user based on a sensor signal, such as caution or warning, a request for a response to such information, and the like.

For the convenience of explanation, displaying a notification message related to a request to the user, such as information or a response, on the display portion 2A or the intermediate portion 2B of the display 2 is referred to as "display of a notification or the like". As illustrated in, e.g., FIG. 7, the message portion of the displayed image in the display of a notification or the like is referred to as the "message portion M". Additionally, a side of the display 2 closer to the display portion 2A is referred to as the "upper" side, while a side thereof closer to the operation portion 2C is referred to as the "lower" side. Note that the message that needs to be transmitted to the user in the display of a notification or the like is not limited to the examples of the notification and the request described above.

When the display of a notification or the like is performed as illustrated in, e.g., FIG. 7, the control unit 3 executes the first display control in which the message portion M displayed on the display portion 2A or the intermediate portion 2B is moved to the operation portion 2C. As a result, a video in which the message portion M flows from the upper side to the lower side is displayed on the display 2 and, even when the display 2 is located in the peripheral vision of the user, the user is allowed to recognize that any notification or the like is made.

Note that, in FIG. 7, the message portion M after the transfer is hatched, but the hatching does not indicate a cross section. Additionally, in FIG. 7, the direction of the movement of the message portion M caused by the first display control is indicated by the hollow arrow, while a rough boundary between the display portion 2A and the intermediate portion 2B is indicated by a broken line for the sake of convenience.

Figure 8:
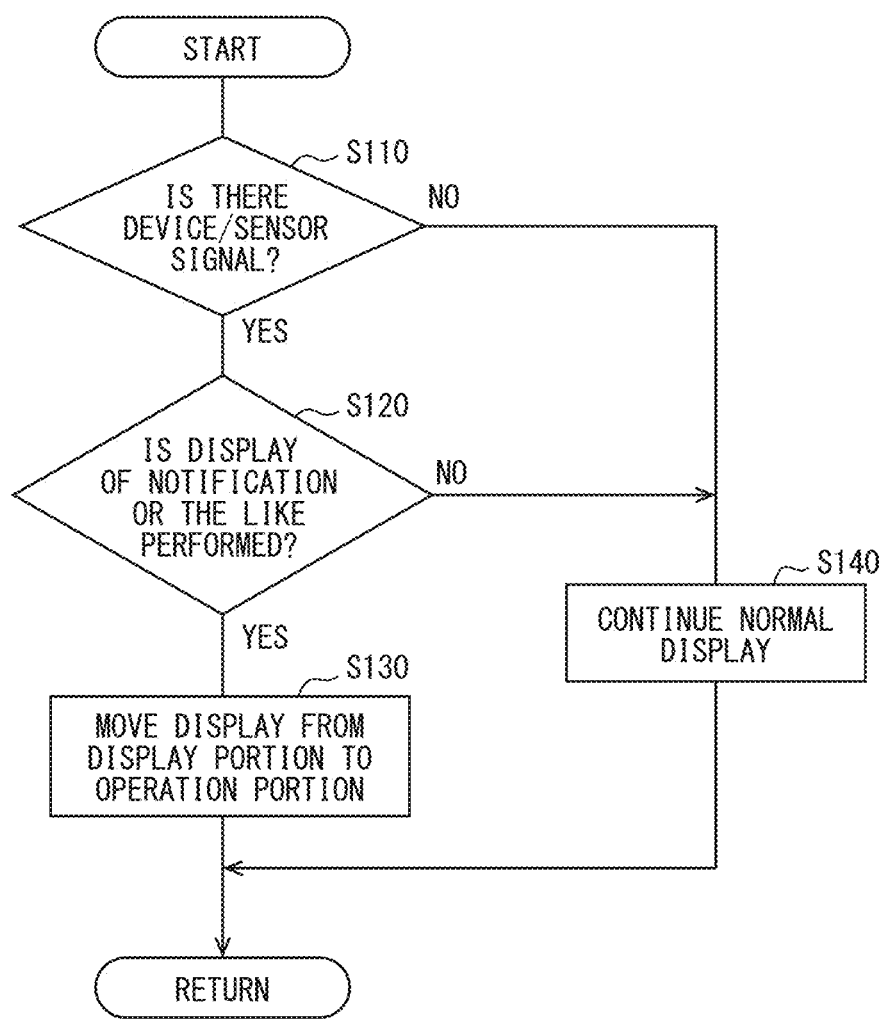
FIG. 8 is a flow chart illustrating an example of a processing operation according to the first display control.

For example, the control unit 3 reads an image display program stored on the recording medium not shown, executes a control flow illustrated in FIG. 8, and performs the first display control when a predetermined condition is satisfied. For example, the control unit 3 starts processing illustrated in FIG. 8 when a predetermined starting condition, such as turning ON of a power source of the display 2 or turning ON of an ignition of the host vehicle, is satisfied.

In Step S110, for example, the control unit 3 determines whether or not a video signal or a sensor signal from the in-vehicle device 5 is input thereto. For example, when making an affirmative determination in Step S110, the control unit 3 advances the processing to Step S120 while, when making a negative determination in Step S110, the control unit 3 advances the processing to Step S140.

In Step S120, for example, the control unit 3 determines whether or not the display of a notification or the like is performed and, when making an affirmative determination, the control unit 3 advances the processing to Step S130 while, when making a negative determination, the control unit 3 advances the processing to Step S140. For example, the determination in Step S120 is not limited, and may be made on the basis of whether or not a specified sensor signal or video signal is included in the various signals from the in-vehicle device 5.

In Step S130, for example, the control unit 3 performs the first display control in which the message portion M of the displayed image is moved from the display portion 2A or the intermediate portion 2B to the operation portion 2C. As a result, the message portion M is transferred from the upper side to the lower side of the display 2 across the bezel 22, and the display 2 performs video display which allows the user to recognize that there is a notification or the like even in a situation in which the line of sight of the user is not directed to the display 2. In addition, since the message portion M moves to the operation portion 2C of the display 2 which is an operation surface that is more easily reached by a finger of the user and allows the user to perform an easier touch operation than the display portion 2A of the display 2, an effect of further improving an operationality can also be obtained.

Note that, in Step S130, as illustrated in, e.g., FIG. 9, the control unit 3 may also execute display control that prioritizes the message portion M over a portion of the displayed image which is located on the operation portion 2C and gives over a display space to the message portion M. Specifically, when the plurality of icons G (GUIs) are displayed on the operation portion 2C, the control unit 3 performs control of moving the plurality of GUIs to a region not overlapping the message portion M transferred from the display portion 2A side. When the message portion M has been transferred to a right side region of the operation portion 2C as illustrated in, e.g., FIG. 9, the control unit 3 performs control of moving the plurality of GUIs and the like displayed on the operation portion 2C to a left side region of the operation portion 2C.

In Step S140, for example, the control unit 3 does not execute the first display control, and outputs video signals corresponding to the various contents from the in-vehicle device 5 or the like to the display 2 to cause the display 2 to display an image. In this case, the display 2 performs display such that, e.g., portions of the displayed image which are located on the display portion 2A and the intermediate portion 2B stay within these regions (hereinafter referred to as "normal display").

For example, after the processing in Step S130 or Step S140, the control unit 3 repeats the processing described above until a predetermined ending condition, such as turning OFF of the power source of the display 2, is satisfied. As described above, the display system 1 executes the first display control at the time of the display of a notification or the like to allow the user to recognize that a notification to the user or the like is displayed on the display 2 even when, e.g., the user is travelling the host vehicle and in a situation in which the user is attentively looking at the front of the host vehicle.

Next, a description will be given of the second display control. The second display control is executed when the user performs a touch operation on the operation portion 2C to give a feedback to the in-vehicle device 5 or the like. Note that the feedback resulting from the touch operation is not limited, and examples thereof include various settings related to the various contents corresponding to the in-vehicle device 5 and changes thereof, completion of an operation such as a response to the display of a notification or the like, and the like.

As illustrated in, e.g., FIG. 10, when the touch operation is performed on the operation portion 2C and the feedback is given by the operation, the control unit 3 performs the second display control which causes a flow of a video from the operation portion 2C toward the intermediate portion 2B and the display portion 2A. As a result, when the touch operation is performed on the operation portion 2C, a video transferring from the lower side to the upper side is displayed on the display 2 and, even when the display 2 is located in the peripheral vision of the user, the user can recognize that the touch operation is completed. Note that, in the second display control, for example, a video starting to transfer from the portion of the operation portion 2C where the touch operation is performed to the display portion 2A side across the bezel 22 needs only to be displayed, and a type of the video may appropriately be changed depending on a content or the like.

Figure 11:
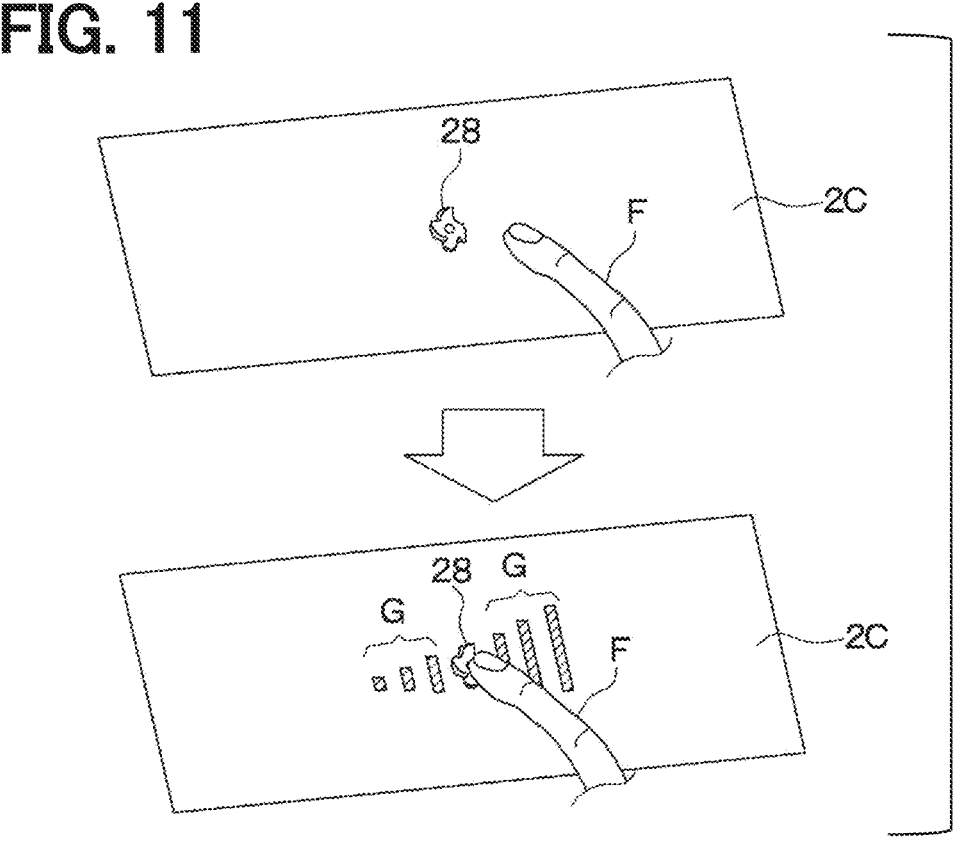
FIG. 11 is a diagram illustrating an example of a touch operation on an ornament switch and the resulting image display.

As illustrated in, e.g., FIG. 11, when the ornament switch 28 is placed and the operating body such as a finger F of the user touches the ornament switch 28, the operation portion 2C is configured to display the various GUIs such as the icons G related to the touched switch. At this time, for example, the operation portion 2C executes display control such that the GUI associated with the ornament switch 28 is displayed only for a predetermined period from a time when the user touched the ornament switch 28 and, when the predetermined period has elapsed, the GUI disappears. Then, the user can perform a touch operation on the various GUIs displayed as a result of the touching of the ornament switch 28 within the display period thereof. In a case where, e.g., a plurality of the ornament switches 28 are arranged at predetermined intervals over the operation portion 2C, when the user touches one of the ornament switches 28, the GUIs corresponding to positions on both sides of the switch on the operation portion 2C are displayed. As a result, when there is no touch operation on the operation portion 2C, the display 2 is brought into a state where the various GUIs are not displayed to have a simple-looking operation region.

Note that, similarly to, e.g., the decorative member 215, the ornament switch 28 may also be configured to transmit the image light from the display panel 25 to the outside, while allowing the user to recognize a predetermined appearance, such as a metallic appearance. As a result, even in a region where the ornament switch 28 is disposed, image display can be performed to further increase a sense of feedback to the user.

Figure 12:
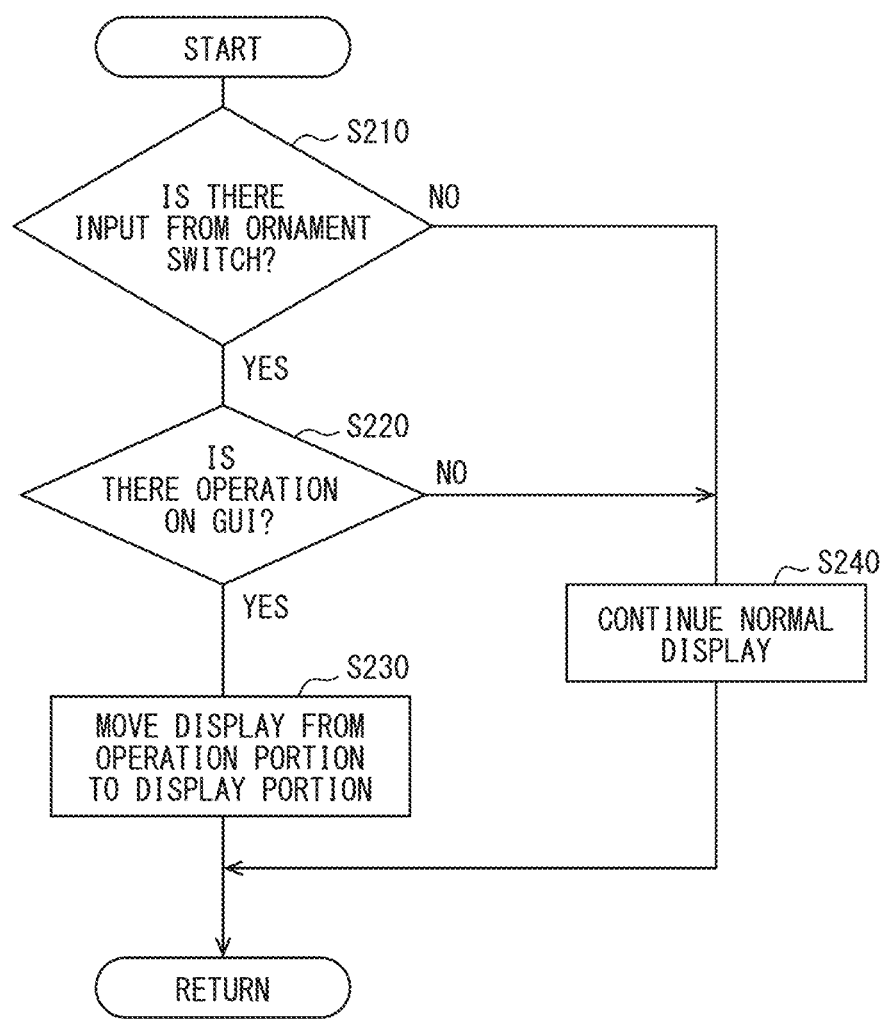
FIG. 12 is a flow chart illustrating an example of a processing operation according to second display control.

For example, the control unit 3 reads the image display program stored on the recording medium not shown to execute a control flow illustrated in FIG. 12, and executes the second display control when the user has performed a touch operation on the GUIs displayed on the operation portion 2C. For example, in the same manner as in the first display control, when a predetermined starting condition, such as the turning ON of the power source of the display 2, is satisfied, the control unit 3 starts processing illustrated in FIG. 12.

In Step S210, for example, the control unit 3 determines whether or not a signal from the ornament switch 28 is input thereto. For example, when making an affirmative determination in Step S210, the control unit 3 advances the processing to Step S220 while, when making a negative determination in Step S210, the control unit 3 advances the processing to Step S240.

In Step S220, for example, the control unit 3 determines whether or not a touch signal is input from a position of the GUI displayed on the operation portion 2C and, when an affirmative determination is made, the control unit 3 advances the processing to Step S230 while, when a negative determination is made, the control unit 3 advances the processing to Step S240.

In Step S230, for example, the control unit 3 causes the operation portion 2C to display the image corresponding to the GUI which is displayed on the operation portion 2C and on which the user has performed the touch operation, and then executes the second display control which causes a video moving from the position of the GUI to the intermediate portion 1B or the display portion 1A to be displayed. As a result, the display 2 displays the video which starts at the position of the GUI on which the user has performed the touch operation to transfer from the lower side of the display 2 to the upper side thereof across the bezel 22. Consequently, even in a situation in which the user has performed the touch operation without directing his or her line of sight to the display 2, it is possible to allow the user to recognize that a feedback is given to the system side by the touch operation.

Figure 13:
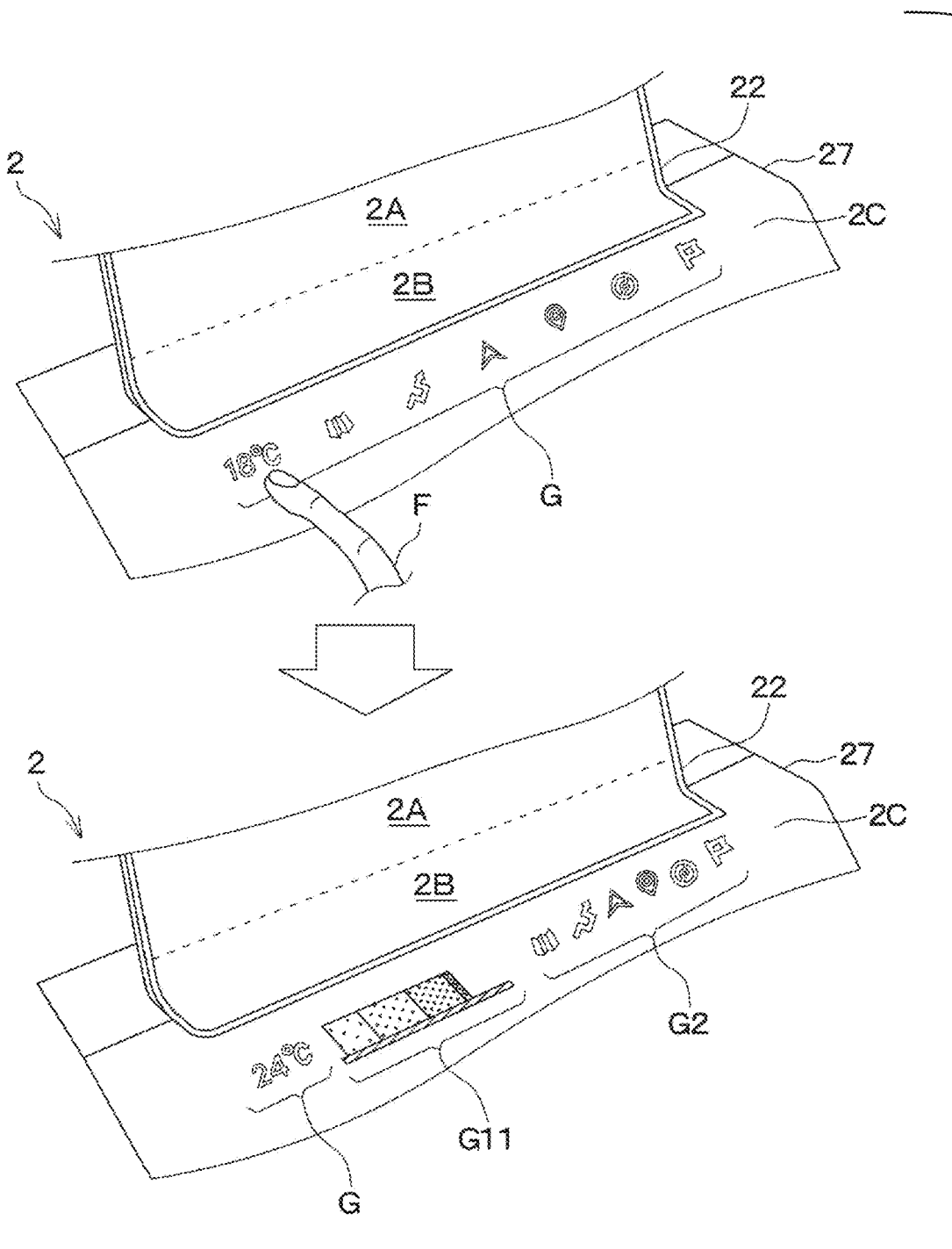
FIG. 13 is a diagram illustrating an example of display control resulting from the touch operation on the operation portion.

Note that, in Step S230, as illustrated in, e.g., FIG. 13, when the various GUIs such as the plurality of icons G are displayed on the operation portion 2C and the touch operation is performed by the user on one of the GUIs, the control unit 3 executes the display control which gives over a display space. Specifically, it is assumed that, e.g., the user has touched one of the plurality of icons G with the finger F. At this time, on the operation portion 2C, an image G11 associated with the one icon G touched by the user is displayed, and an image in which icons G2 other than the touched icon G have moved to an end region in such a manner as to avoid the icon G2 is displayed. Thus, the control unit 3 performs control which moves the plurality of GUIs to a region of the operation portion 2C which not overlap the GUI touched by the user and a related image of the GUI newly displayed by the touch operation. Thus, it is possible to ensure a space when the user continuously perform a touch operation on the related image of the GUI on which the user has performed the touch operation and allow the touch operation to be performed without haste.

In Step S240, for example, the control unit 3 does not execute the second display control, and executes the normal display in which an image corresponding to the various contents from the in-vehicle device 5 or the like is displayed on the display 2.

After processing in S230 or Step S240, for example, the control unit 3 repeats the processing described above until the predetermined ending condition, such as the turning OFF of the power source of the display 2, is satisfied. By thus executing the second display control at the time of the touch operation, the display system 1 allows the user to recognize that the feedback is given by the touch operation even when, e.g., the user is travelling the host vehicle and in the situation in which the user is watching the front of the host vehicle.

The display system 1 according to the embodiment causes movement of a video across the regions between the display portion 2A or the intermediate portion 2B and the operation portion 2C to be displayed when a notification to the user is displayed on the display 2 or when the touch operation is performed by the user on the display portion 2C. Consequently, on the display 2, a drastic transfer of the video between the inside and outside of a region surrounded by the bezel 22 is displayed on the display 2 and, even in a situation in which the user is not attentively looking at the display 2, it is possible to allow the user to recognize a notification or a feedback of the completion of an operation. In addition, since the display 2 has the display portion 2A which is a main display region for the content and the operation portion 2C used as a main operation region and these are configured to be arranged at a predetermined angle formed therebetween, it is possible to achieve both a visibility on the display portion 2A and an easy operation on the operation portion 2C. It can also be said that the display system 1 has a configuration in which the display device including the display 2 executes the image display program corresponding to at least one of the first display control or the second display control to implement an image display method which causes a transfer of an image between two regions which are the display portion 2A and the operation portion 2C.

Other Embodiments

The present disclosure has been described in accordance with embodiments but the present disclosure is not limited to those embodiments or structures. The present disclosure also includes various modifications and modifications within an equivalent range. In addition, various combinations and configurations, and further, other combinations and configurations including more, less, or only a single element thereof are also within the spirit and scope of the present disclosure.

The ornament switch 28 need not be a member separate from the touch panel 24, and may also be a portion of the touch panel 24. In this case, in a state before the user performs the touch operation on the operation portion 2C for example, the display 2 is controlled to display only the GUI corresponding to the ornament switch 28 on the operation portion 2C. Then, in a case where, e.g., the user touches a display position of the GUI, the display 2 is controlled to display the various GUIs corresponding to the GUI or the like thereof. Accordingly, the display 2 is configured to allow the same touch operation as performed in the foregoing embodiment having the ornament switch 28.

Alternatively, for example, the ornament switch 28 need not be a switch member that outputs an output signal when touched by the finger F of the user or the like, and may also be a decorative component to be bonded onto the decorative member 215. In this case, for example, the ornament switch 28 is bonded to a portion of the decorative member 215 which is located on a predetermined region of the touch panel 24 via an optical adhesive or the like. At this time, the operation portion 2C is configured such that, as a result of touching of the ornament switch 28 by the user, a signal is output from the touch panel 24, and the various associated GUIs starting from the ornament switch 28 are displayed. With such a configuration also, the display system 1 is provided which executes the same display control as executed in a case where the ornament switch 28 is the switch member.

Figure 14:
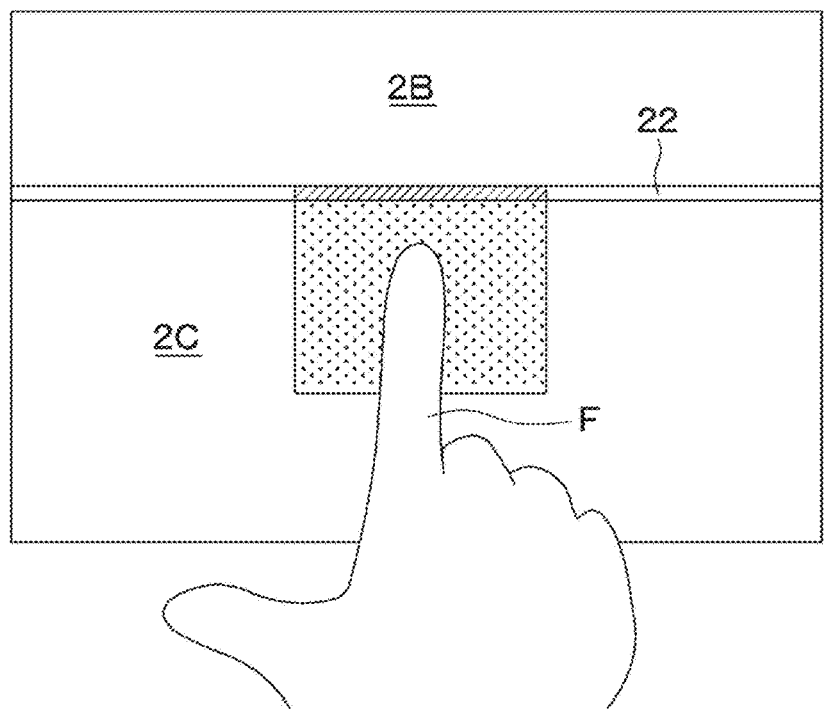
FIG. 14 is a diagram illustrating an example of image display when the bezel is configured to have translucency.

Similarly to the decorative member 215, from the viewpoint of design, the bezel 22 is preferably configured to, e.g., transmit the light from the display panel 25. Thus, as illustrated in, e.g., FIG. 14, the user is allowed to visually recognize the image displayed on the display panel 25 even on the bezel 22, and an effect of accentuating the transfer of a video across the bezel 22 in the first and second display controls and allowing a notification or the like and the feedback to be more easily recognized is obtained. Note that, in FIG. 14, a portion of the displayed image is hatched, but the hatching does not indicate a cross section.

Figure 15:
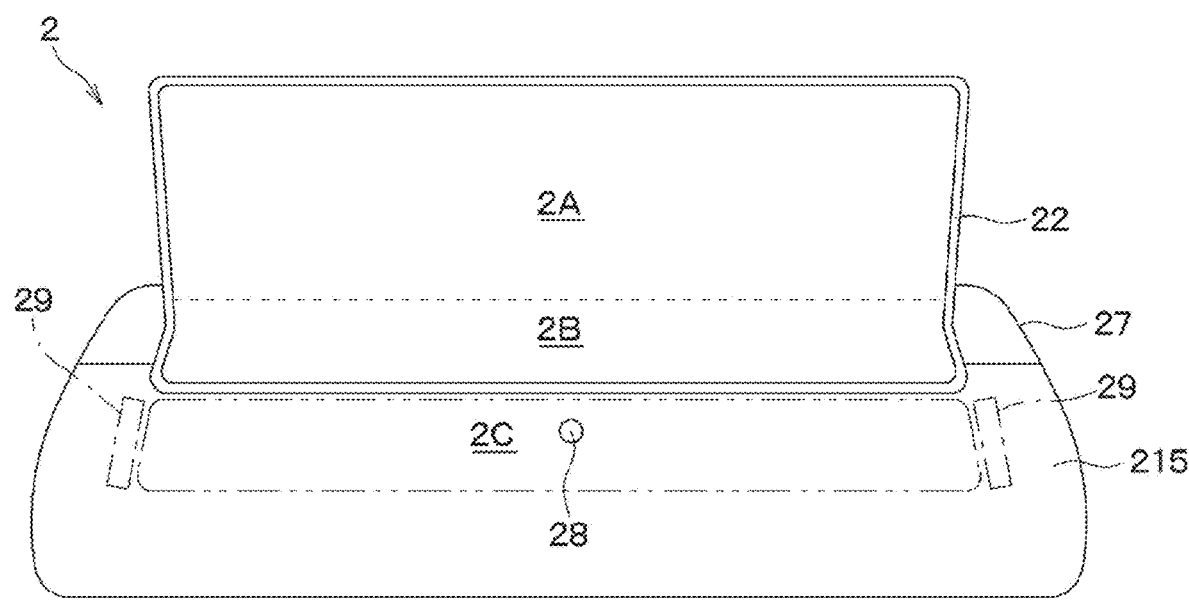
FIG. 15 is a diagram illustrating an example of placement of actuator elements when the display includes the actuator elements.

As illustrated in, e.g., FIG. 15, the display 2 may also be configured such that the operation portion 2C has actuator elements 29 and, at the time of a touch operation, an operation surface is vibrated to give a sense of operation to the user. In this case, as each of the actuator elements 29, e.g., a piezoelectric element capable of a bending operation with a voltage applied thereto or the like is used, and the actuator elements 29 may be bonded to regions of the other surface 21b of the transparent cover 21 which are located on the operation portion 2C and disposed at both ends with the touch panel 24 being interposed therebetween. Then, when sensing, e.g., a touch operation on the basis of a signal from the touch panel 24, the control unit 3 executes feedback control in which the actuator elements 29 are driven to cause the user, who is performing the touch operation, to perceive vibration and present the sense of operation. This can further improve the sense of operation on the operation portion 2C.

For example, the control unit 3 may also execute display control for avoiding a state where, due to a large number of display contents and a large amount of text information, the image displayed on the display 2 bothers the user. For example, during a normal period during which a predetermined operation, selection, and the like are not required as illustrated in FIG. 3, the control unit 3 may execute display control such that information on the displayed image other than the contents displayed at that time is reduced or omitted to reduce an amount of the information.

Figure 16A:
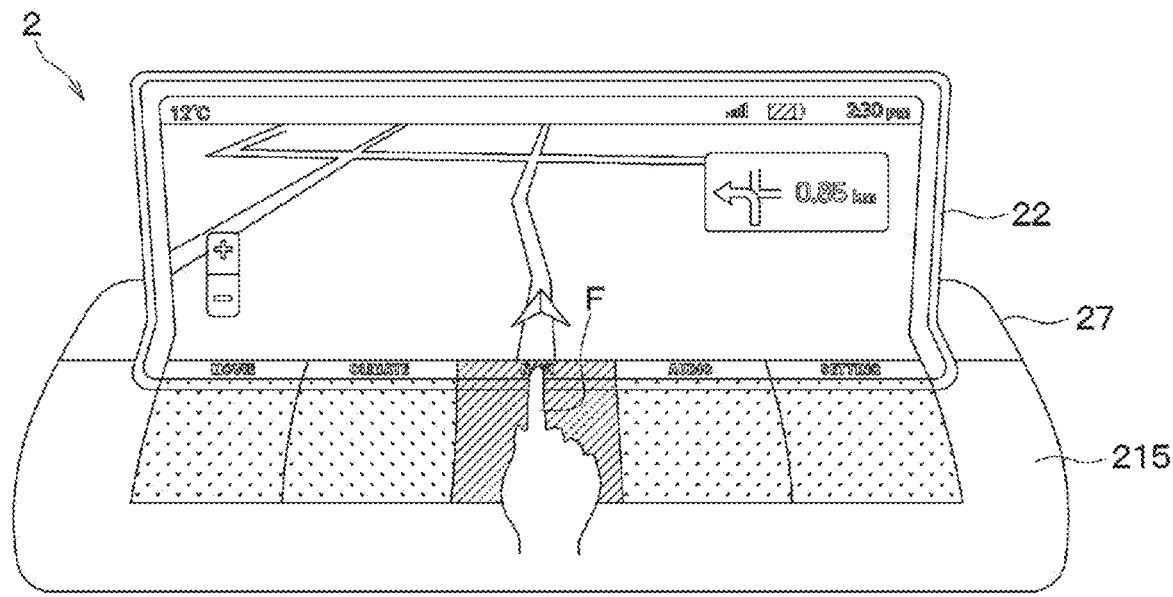
FIG. 16A is a diagram illustrating an example of image display on the display during the touch operation by a user.
Figure 16B:
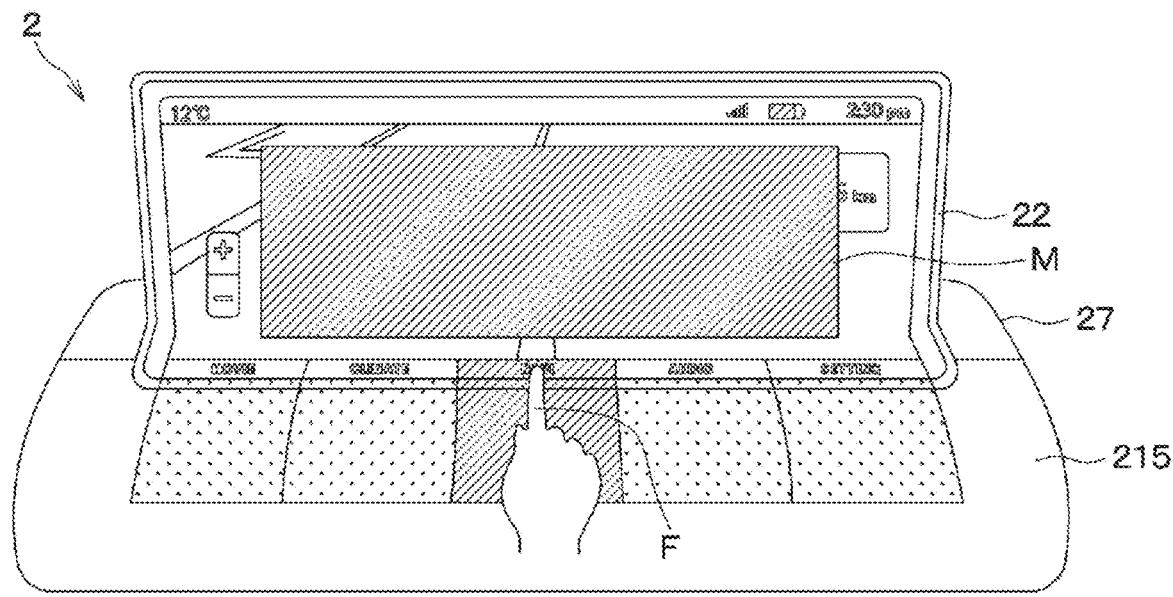
FIG. 16B is a diagram illustrating an example in which an image related to a content on which the user has performed the touch operation is enlargedly displayed on the display portion.

Meanwhile, as illustrated in, e.g., FIG. 16A, the control unit 3 may perform display control such that, in a situation in which a predetermined operation and selection are required, required information is displayed or enlarged. In this case, for example, a type of information to be displayed on the display 2 and a priority thereof are set in advance, and the set data is stored in the control unit 3 or on an external recording medium not shown. As a result of the execution of the display control described above by the control unit 3, the required information is selectively displayed on the display region of the display 2 to allow the user to more easily recognize the required information, and an effect of improving an operability on the display 2 is also obtained. In the case described above, as illustrated in, e.g., FIG. 16B, the control unit 3 may execute display control such that, to allow the user to use a wide display area, an image of selection, setting, or the like with the content selected on the intermediate portion 2B or the operation portion 2C is displayed large on the display portion 2A.

For example, the display system 1 may also be configured to include, as the in-vehicle device 5, an image capturing unit which captures an image of a passenger of the host vehicle and determine whether or not an operator is the driver when a touch operation is performed on the display 2. In this case, a configuration thereof may be such that, e.g., the image capturing unit such as a camera is mounted in the host vehicle to capture an image of at least the driver and determines, using a known image authentication technology, whether or not the driver has reached toward the display 2 on the basis of captured image data. The configuration may also be such that, e.g., the image capturing unit outputs a signal according to a result of the determination to the control unit 3, and the control unit 3 determines whether or not to execute the second display control on the basis of the signal. For example, the control unit 3 is configured to execute the second display control when the operator of the display 2 is the driver, and not to execute the second display control otherwise. Note that, as the image capturing unit, e.g., a driver status monitor (registered trademark) commercially available from Denso Corporation or the like may be used, but the image capturing unit may also be another known image capturing device.

The display system 1 may also be configured to execute at least one of the first display control or the second display control. For example, the display system 1 is configured to execute only the first display control when it is prioritized to cause the user to recognize a notification thereto, while being configured to execute only the second display control when it is prioritized to cause the user to recognize a feedback to a touch operation. This also allows the user who is not attentively looking at the display 2 to recognize the notification or feedback.

The control unit 3 and the method thereof described in the present disclosure may be implemented by a dedicated computer, which is configured by a processor and a memory programmed to execute one or multiple functions embodied by a computer program. Alternatively, the control unit 3 and the method thereof described in the present disclosure may be implemented by a dedicated computer, which is configured by a processor and one or more dedicated hardware logic circuits. Alternatively, the control unit 3 and the method thereof described in the present disclosure may be implemented by a combination of a special purpose computer including a processor programmed to execute one or more functions by executing a computer program and a memory and a special purpose computer including a processor with one or more dedicated hardware logic circuits. The computer program may be stored in a non-transitory tangible computer-readable recording medium as an instruction to be executed by a computer.

What is claimed is:

1. A display device comprising:
a display including a display portion which is a region where an image is to be displayed, and an operation portion which is a region disposed to be inclined with respect to a virtual plane formed by the display portion and capable of allowing image display and a touch operation to be performed thereon; and
a control unit configured to execute display control of an image on the display,
wherein
the display device is an in-vehicle display device mounted in a vehicle,
the control unit executes, as the display control, first display control of causing, when a notification is made to a user, movement of the notification from the display portion to the operation portion and causing the operation portion to display the notification, and second display control of causing, when the touch operation is performed by the user on the operation portion, movement of an image corresponding to the touch operation from the operation portion to the display portion and causing the display portion to display the image corresponding to the touch operation,
the operation portion is configured to display a graphical user interface (GUI),
the control unit, when executing the first display control to display the notification on the operation portion, also executes display control of moving the GUI displayed on the operation portion to a position on the operation portion where the GUI does not overlap the notification,
the display portion is surrounded by a bezel
the operation portion is disposed outside the bezel,
the operation portion includes a switch member configured to output a signal when an operating body of the user comes into contact with or approaches the switch member and
the switch member is configured to transmit image light from the display to the outside while allowing the user to visually recognize a predetermined appearance.

2. The display device according to claim 1, wherein,
when the touch operation is performed by the user on one of a plurality of GUIs displayed on the operation portion, the control unit executes display control of moving the GUI which is included in the plurality of GUIs and other than the GUI on which the touch operation is performed by the user to a position on the operation portion where the GUI does not overlap a related image displayed by the touch operation.

3. The display device according to claim 1, wherein:
the display further includes a transparent cover serving as an operation surface for the user, and an actuator element that vibrates the transparent cover; and
when the transparent cover is touched by the user, the control unit executes feedback control of driving the actuator element and causing the user performing the touch operation to perceive vibration.

4. The display device according to claim 1, wherein
in the first display control, the control unit makes the notification when the user is not operating the operation portion.

5. An image display method that is an image display method in a display device including a display including a display portion which is a region where an image is to be displayed, and an operation portion which is a region disposed to be inclined with respect to a virtual plane formed by the display portion and capable of allowing image display and a touch operation to be performed thereon, the display device is an in-vehicle display device mounted in a vehicle, the display portion is surrounded by a bezel, the operation portion is configured to display a graphical user interface (GUI) and is disposed outside the bezel, the operation portion including a switch member configured to output a signal when an operating body of the user comes into contact with or approaches the switch member, and the switch member being configured to transmit image light from the display to the outside while allowing the user to visually recognize a predetermined appearance, the image display method comprising:
executing a first display of causing, when a notification is made to a user, movement of the notification from the display portion to the operation portion and causing the operation portion to display the notification, and a second display of causing, when the touch operation is performed by the user on the operation portion, movement of an image corresponding to the touch operation from the operation portion to the display portion and causing the display portion to display the image corresponding to the touch operation; and
when executing the first display to display the notification on the operation portion, also executing moving the GUI displayed on the operation portion to a position on the operation portion where the GUI does not overlap the notification.

6. The display method according to claim 5, wherein
in the first display, the notification is made when the user is not operating the operation portion.

7. A non-transitory storage medium storing an image display program in a display device including a display including a display portion which is a region where an image is to be displayed and an operation portion which is a region disposed to be inclined with respect to a virtual plane formed by the display portion and capable of allowing image display and a touch operation to be performed thereon, the display device is an in-vehicle display device mounted in a vehicle, the display portion is surrounded by a bezel, the operation portion is configured to display a graphical user interface (GUI) and is disposed outside the bezel, the operation portion including a switch member configured to output a signal when an operating body of the user comes into contact with or approaches the switch member, and the switch member being configured to transmit image light from the display to the outside while allowing the user to visually recognize a predetermined appearance, the image display program comprising:
instructions for executing a first display of causing, when a notification is made to a user, movement of the notification from the display portion to the operation portion and causing the operation portion to display the notification, and a second display of causing, when the touch operation is performed by the user on the operation portion, movement of an image corresponding to the touch operation from the operation portion to the display portion and causing the display portion to display the image corresponding to the touch operation; and
when executing the first display to display the notification of the operation portion, also executing moving the GUI displayed on the operation portion to a position on the operation portion where the GUI does not overlap the notification.

8. The non-transitory storage medium storing the image display program according to claim 7, wherein
in the first display, the notification is made when the user is not operating the operation portion.

* * * * *